United States Patent [19]
Nordeman

[11] Patent Number: 6,134,450
[45] Date of Patent: Oct. 17, 2000

[54] METHOD OF INITIALIZING A MOBILE COMMUNICATION DEVICE FOR MAKING A DISPATCH CALL

[75] Inventor: Roger Douglas Nordeman, Coral Springs, Fla.

[73] Assignee: Motorola, Inc., Schaumburg, Ill.

[21] Appl. No.: 09/366,099

[22] Filed: Aug. 2, 1999

[51] Int. Cl.[7] .............................. H04J 3/12; H04L 12/18
[52] U.S. Cl. ................... 455/517; 455/507; 455/508; 455/518; 455/519; 455/521
[58] Field of Search ................................ 455/517, 518, 455/519, 521, 412, 566, 507, 508

[56] References Cited

U.S. PATENT DOCUMENTS

| | | |
|---|---|---|
| 5,423,061 | 6/1995 | Fumarolo et al. .................. 455/519 |
| 5,450,405 | 9/1995 | Maher et al. ........................ 455/519 |
| 5,530,916 | 6/1996 | Schultz ................................ 455/518 |
| 5,613,209 | 3/1997 | Peterson et al. .................... 455/518 |

*Primary Examiner*—Lee Nguyen
*Assistant Examiner*—Simon Nguyen
*Attorney, Agent, or Firm*—Scott M. Garrett

[57] ABSTRACT

A mobile communication device (116) establishes a network connection with a server (120) and searches a database (122) for calling information associated with a party the user of the mobile communication device desires to call. Once the information is located, it is formatted (508) by the server so that it is in a browsable format, suitable for displaying on the mobile communication device. The server transmits (510) the formatted information to the mobile communication device, where calling options are displayed (512) to the user. The user then selects (514) one of the options, and the mobile communication device configures (516) itself to perform the desired communication activity.

10 Claims, 4 Drawing Sheets

METHOD OF INITIALIZING A MOBILE COMMUNICATION DEVICE FOR MAKING A DISPATCH CALL

TECHNICAL FIELD

This invention relates in general to mobile communications, and more particularly to mobile communication systems that provide network browser support for mobile stations.

BACKGROUND OF THE INVENTION

Personal communication devices have gained widespread popularity and have dramatically changed the telecommunications industry. In almost all metropolitan areas, for example, additional telephone area codes have been added to accommodate the increasing number of mobile communication service subscribers. It is also true that there has been an increase in the variety of services offered by communication system operators. For example, in many metropolitan areas there are mobile networks that support different types of communications, such as telephone interconnect calls and dispatch calls. More recently wireless mobile data network services have been introduced as well.

One problem that persists is obtaining the calling number of a party the mobile user wishes to call. Most modern communication devices include a semi-permanent memory means for storing numbers and associated names of parties that are frequently called, but if the mobile user does not know or have the number stored, the user will have to find the number. In some instances the user may not know who to call, but merely wishes to find information about local businesses, for example, what hotels are in the area.

With the deployment of mobile wireless networking, where mobile communication devices perform functions similar to personal computers that "browse" the internet, it is possible for people and business to make calling information available to mobile network users in a manner similar to that in which information is made available on the world wide web. Making information available in this manner reduces the need for storing calling numbers in mobile communication devices and directory assistance services since, if a mobile user does not know the number, the user can connect to a networked server and locate the number.

However, a mobile telephone call is subject to certain charges by the service provider. Dispatch calling offers a less expensive alternative to a mobile phone call, and also permits group calls to multiple persons at the same time. These are also known as fleet calls. When incorporating dispatch calling, and the various types of dispatch calling, in information databases, there is a need for a method of initializing the mobile communication device to make the right type of call based on the options selected by the user.

DETAILED DESCRIPTION OF A PREFERRED EMBODIMENT

Figure 1:
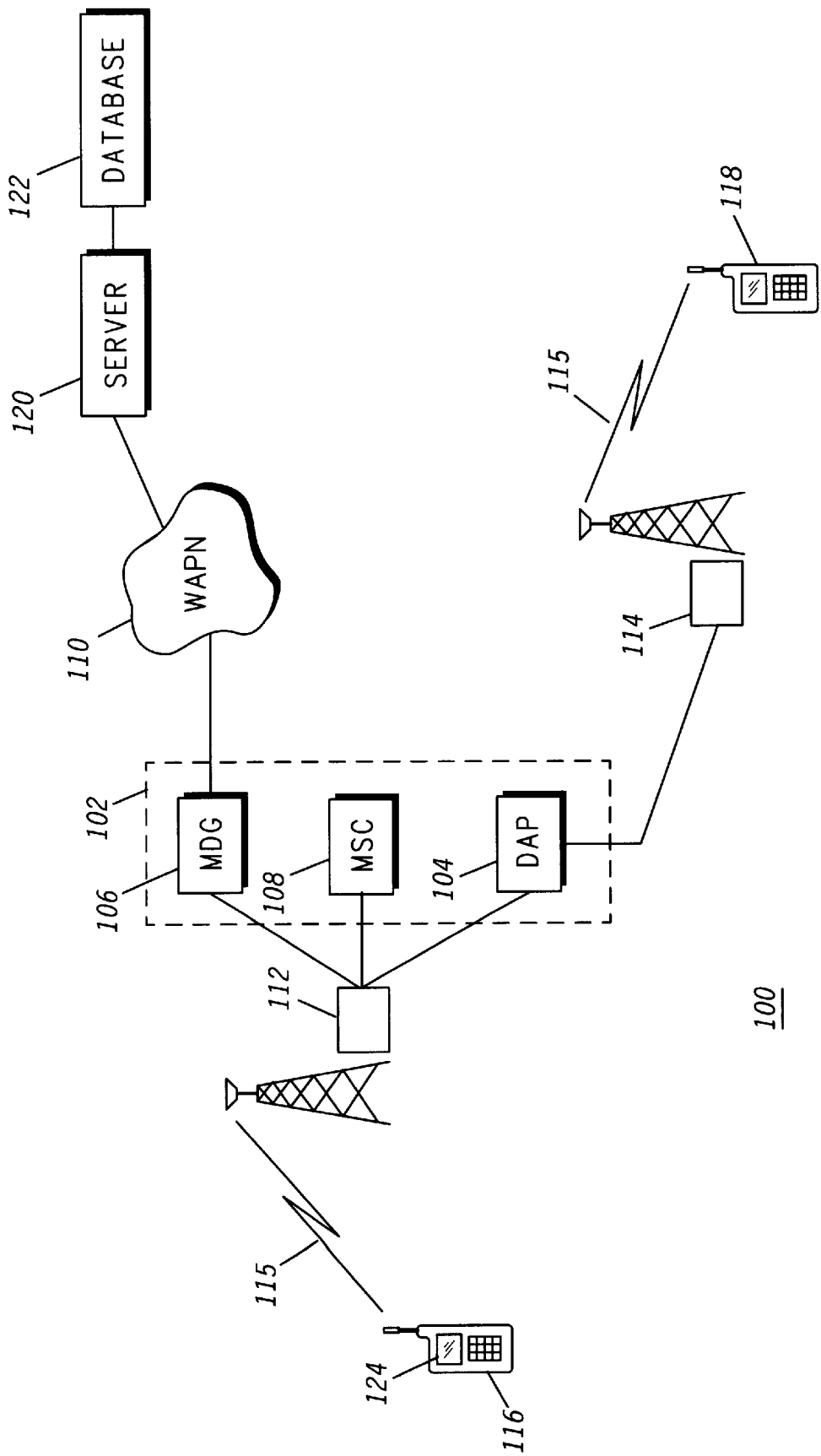
FIG. 1 shows a system schematic of a communication system, in accordance with the invention.

While the specification concludes with claims defining the features of the invention that are regarded as novel, it is believed that the invention will be better understood from a consideration of the following description in conjunction with the drawing figures, in which like reference numerals are carried forward. The invention prescribes rules for formatting database information relating to dispatch calling numbers for transmission to a mobile communication device. The communication device displays the information according to the format, allowing the user to select from several dispatch calling options, such as making a private dispatch call, sending a dispatch alert or page, or making a fleet or group call. Once the user selects the desired dispatch calling option, the communication device configures itself so that the call can be placed upon, for example, pushing a dispatch call button.

Referring now to FIG. 1, there is shown a system schematic of a communication system 100, in accordance with the invention. The system comprises a central office 102 including communication agent processors such as, for example, a dispatch application processor 104 (DAP), a mobile data gateway 106 (MDG), and a mobile switching center 108 (MSC). The DAP provides dispatch calling capability within the communication system. Dispatch calling is a half duplex communication mode, similar in effect to two way radio communication. The difference here is that dispatch communication between mobile users is done over a network, and the network locates the parties and establishes and maintains a circuit during the dispatch call. The mobile data gateway provides connectivity to a wide area packet network 110 (WAPN), such as the internet, and facilitates data communication using, for example, packet data protocols. The MSC provides telephone support, which is a full duplex circuit type of communication, and provides connectivity to a public switched telephone network, as is well known in the art. Generally, the communication system is a frequency reuse system, in the case of time division channels such as in time division multiple access (TDMA) protocols, or a code reuse system in the case of code division channels such as in code division multiple access (CDMA) protocols. In general these systems can be referred to as cellular because they comprise a plurality of base stations to establish serving cells over a region of operation. The central office is connected to each base station in the system, such as base stations 112 and 114. Each base station provides an air interface 115 within its local vicinity to provide wireless communication resources to mobile communication devices 116 and 118. The mobile communication devices are capable of performing both dispatch communication and packet data communication in addition to telephone communication. Dispatch communication is supported over an air circuit interface while packet data communication is provided over a shared air network interface. In general, the air network interface provides a data channel by using unallocated circuit channels. A circuit channel can be, for example, a time slot in a TDMA air interface.

According to the invention, a first mobile user, using a mobile communication device 116 wishes to make a dispatch call to another mobile user who has a mobile communication device 118, but does not know the dispatch calling number assigned to mobile communication device 118. The first mobile communication device is then operated in a network mode and establishes a network connection to a communication network server 120 over the air network interface. The communication network server 120 may be connected locally to the MDG 106, or over the WAPN 110. The communication network server contains or is connected to a database means 122. The database contains calling information for parties listed in the database. Each database entry may have, for example, a telephone number, a dispatch number, a fleet number, and so on, and may further include other information such as advertising, if the database entry is for a business. The database is searchable by mobile users using network communications. The mobile communication devices comprise network client software that allow them to "browse" information on the server and in the database, similar to the way a personal computer can browse information over the world wide web. The user operates the mobile communication device to request the database for the desired information. The communication network server is a means for formatting the database information with a mark up language, which is a code used by client software to properly display the information, resulting in a browsable database entry. The browsable database entry will include tags to indicate how to display the information, and what type of action to associate with it. A formatted database entry will typically have tags associated with different fields of information, such as telephone numbers, dispatch numbers, fleet numbers, and so on, as well as text formatting. The browsable database entry is transmitted to the requesting mobile communication device 116, where it is displayed to the user on a display 124, according to the format applied by the communication network server. The calling numbers for the party associated with the information are presented as options the user may select. The options are different ways of communicating with the desired party. For example, a first option may be a telephone number, a second option may send a dispatch page or alert, a third option may be a private dispatch call, a fourth option may be for leaving a voice mail, and so on. The user then selects one of the options by, for example, manipulating buttons or a keypad on the mobile communication device. Voice recognition is a possible alternative to manipulating buttons. Upon making a selection, the mobile communication device configures itself to perform the action associated with the option. For example, if the user selected the private dispatch call option, the mobile communication device will quit network mode and load the private dispatch calling number included in the formatted database entry so that the user can initiate a dispatch call to the desired party upon pushing a dispatch call button.

Figure 2:
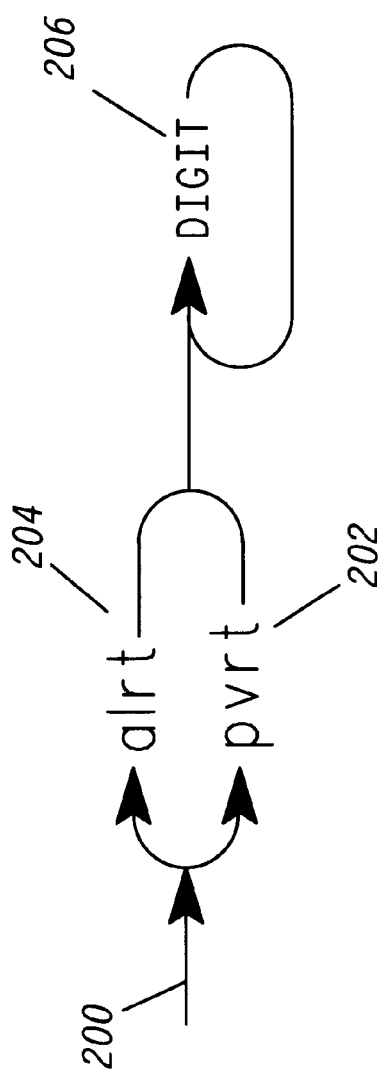
FIG. 2 shows the rules for formatting an intrafleet dispatch call in accordance with the invention.
Figure 3:
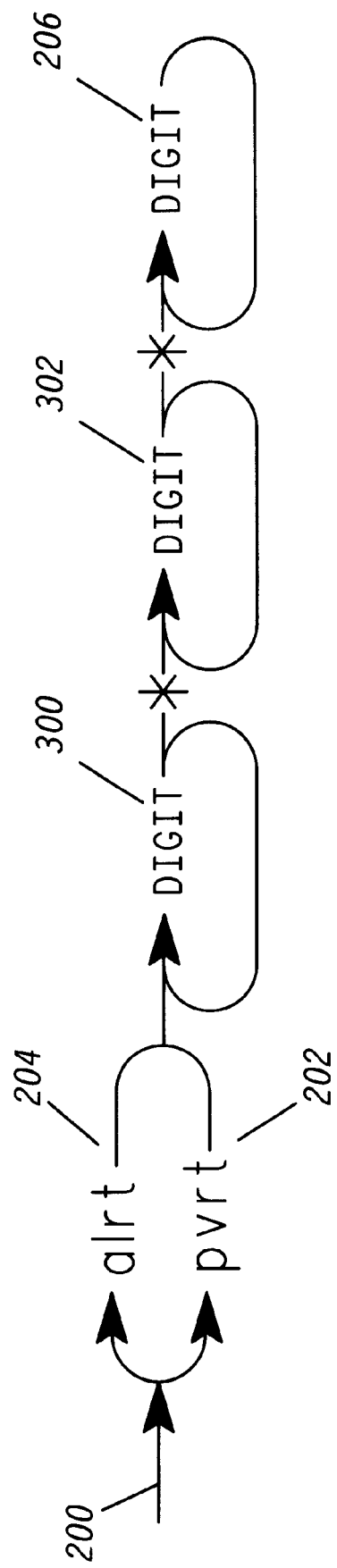
FIG. 3 shows the rules for formatting an interfleet dispatch call in accordance with the invention.
Figure 4:
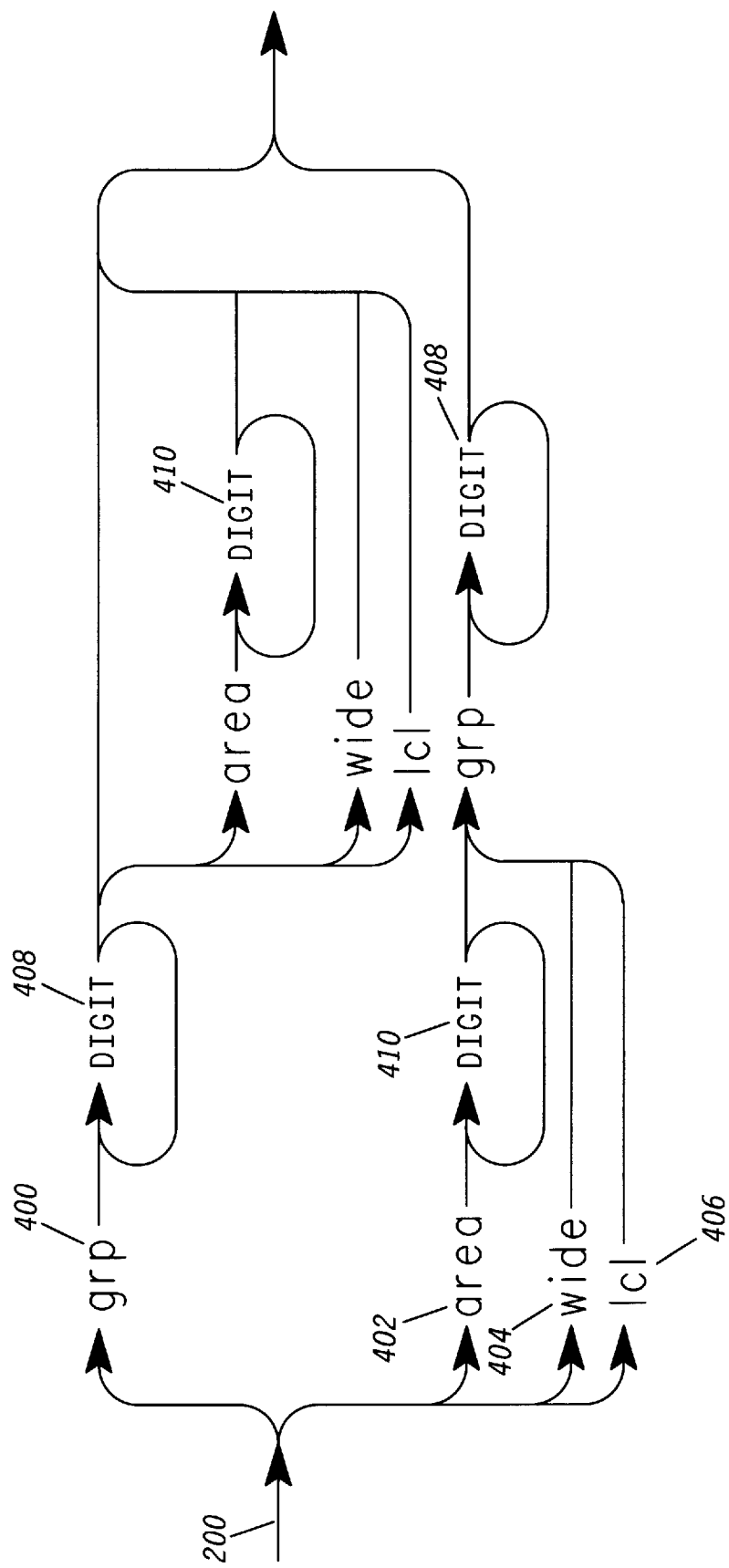
FIG. 4 shows the rules for formatting a group dispatch call in accordance with the invention.

Referring now to FIGS. 2–4, there is shown the rules process for formatting an intrafleet dispatch call, an interfleet dispatch call, and a group dispatch call, respectively, in accordance with the invention. In an intrafleet dispatch call, upon beginning (200) the formatting process, two tags may be used for contacting another individual, which are the private tag 202 (PRVT) and the alert tag 204 (ALRT). Each of these is associated with a dispatch calling number which is provided as a digit string 206. The mark up language used to do the formatting may be, for example, hand held device mark up language (HDML) or wireless application protocol mark up language (WML). HDML is presently in use in some communication systems for supporting network connections. It is similar to hypertext mark up language (HTML) used in world wide web servers, but allows information to be formatted for hand held devices, which in many cases cannot display color or images. WML is presently under consideration as a standard for wireless communication devices, and is similar to HDML. With each tag there may be a text string associated that is displayed, such as, for example, "To make a dispatch call to this person, press 2."

Upon performing the indicated action, the mobile communication device will configure itself to be ready to perform the desired communication activity. Upon initializing a dispatch call, the dispatch calling number and desired dispatch calling option are transmitted to the DAP over the air circuit interface, and the DAP locates the desired party to be called. If an ALRT option was selected, the party to be called receives a page indicating the dispatch calling number of the calling party. If the PVRT option is selected, the dispatch calling number of the calling party will be displayed, and a speaker of the mobile communication device being called will be unmuted so that the voice of the calling party can be heard.

The rule for formatting information to make an interfleet dispatch call, if the party desired to be called is not in the user's fleet, as shown in FIG. 3, is similar to that of an intrafleet call. Again, both pvrt and ALRT tags are used, but more digit information is required. The different digit strings may represent, for example, a region 300, a fleet number 302, and a dispatch calling number 206. These digit strings are separated by a non digit character, such as an asterisk. If this option is selected, these numbers are transmitted to the DAP where they are used to connect to the desired fleet, or to a different DAP serving another region.

The formatting rules for group calls, as shown in FIG. 4, are more involved than those for private calls. A group call is a dispatch call to a group of people, which may be an entire fleet, or a subset thereof, and may include members of other fleets. In the preferred embodiment, there are 4 tags used for formatting group call information; a group tag 400 (GRP), an area tag 402 (AREA), a wide tag 404 (WIDE) and a local tag 406 (LCL). The group tag GRP is associated with a group number 408, which identifies a set of subscribers, and is typically set up by the service provider in advance. The user can also select an area option with a group number. The area tag relates to the geographic area in which group members will be contacted upon initiating a group call. Group members outside of the area will not be called. If no area is selected, a default area is used. The user may select an area other than the default area by selecting the option associated with the area tag, in which an area number 410 is specified. It should be noted that tags are generally case insensitive, so lowercase tags are used in the figures, but correspond to capitalized tag names described here. The user may also select the wide area option to contact members of the group within the entire operating region covered by the DAP, or the user may select the local option (if local is not the default) to contact members within a smaller region near the user initiating the group call. Note that the user may start by either selecting the group option, or an area option. It is contemplated that other tags may be included, such as a tag for telephone communication and a tag for voice mail.

Figure 5:
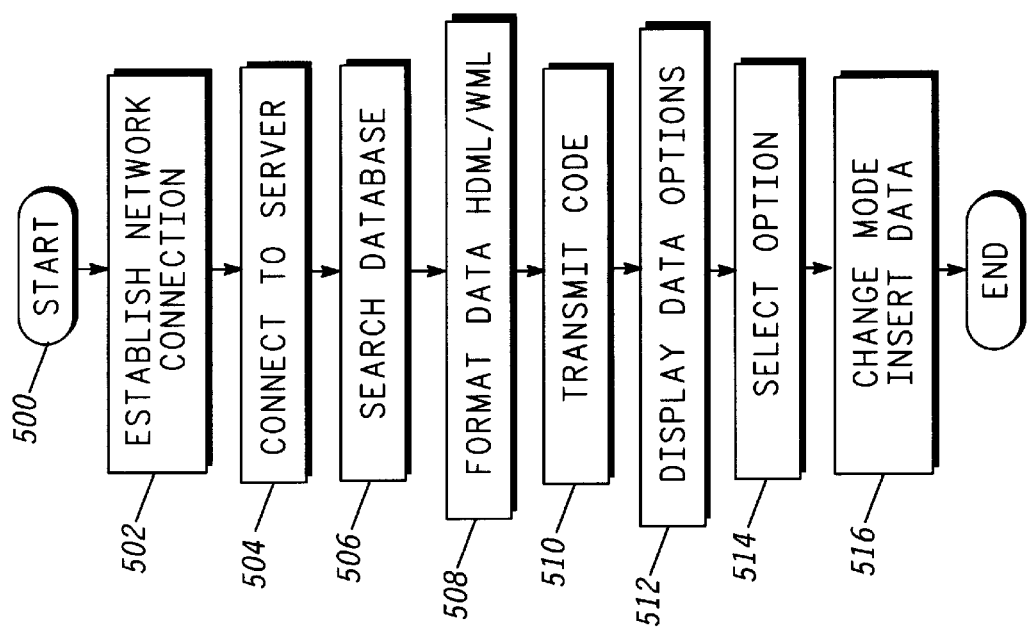
FIG. 5 shows a flow chart diagram of a method of initializing a mobile communication device for a dispatch call, in accordance with the invention.

Referring now to FIG. 5, there is shown a flow chart diagram of a method of initializing a mobile communication device for a dispatch call, in accordance with the invention. At the start (500) the mobile communication device is powered up and has registered for service with the communication system. The user desires to locate calling information for another party, and operates the mobile communication device to establish a network connection (502) over the air network interface, and connects to a mobile communication server (504). By mobile communication server, it is meant that the server simply contains or is connected to a database containing mobile calling information. The mobile communication server is otherwise similar to any other server that may be connected to the network. The user then searches the information (506), or otherwise requests calling information for the party to be called. Once the information is located, the server formats the data (508) as described hereinabove, or, alternatively, provides the information in a preformatted state. The server then transmits the formatted information (510) in a browsable form to the requesting mobile communication device over the network connection. Upon receiving the information, now formatted, the mobile communication device displays the information (512) in accordance with the format code, offering the user one or more options to choose from. The user then selects the desired option (514), and the mobile communication device configures itself to perform the desired communication activity. At this point it can be said that the mobile communication device has been initiated to perform the desired communication activity. If a dispatch option was selected, the mobile communication device will preferably be configured so that upon pressing a dispatch call button, the desired dispatch activity will commence.

Thus, the invention solves the problem of locating calling information, and specifically dispatch calling information, and configuring a mobile communication device to perform the desired communication activity when the calling number of the party to be called is unknown to the calling party. This invention reduces the need to have previously stored or memorized calling numbers, and thus reduces the need for semi-permanent memory in the mobile communication device. It also provides a convenience to mobile users when the specific party to be called is unknown, allowing a user to search a database to locate an appropriate party. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of initializing a mobile communication device for making a dispatch call in a mobile communication network, the mobile communication network providing an air network interface, an air circuit interface, and connectivity to a communication network server and database, the method comprising the steps of:

establishing a network connection between the mobile communication device and the communication network server using the air network interface;

requesting a database entry from the database, performed by the mobile communication device over the air network interface;

formatting the database entry with a mark up language to provide a browsable database entry having a format and including at least one dispatch tag, the at least one dispatch tag corresponding to a dispatch call type;

transmitting the browsable database entry to the mobile communication device over the air network interface;

displaying the database entry on a display of the mobile communication device according to the format, including displaying at least one dispatch calling option corresponding to the at least one dispatch tag, performed by the mobile communication device;

selecting a desired dispatch calling option, performed by a user of the mobile communication device; and configuring the mobile communication device to make a dispatch call corresponding to the dispatch calling option.

2. A method of initializing a mobile communication device for making a dispatch call as defined by claim 1, wherein the step of formatting includes formatting the database entry to include a private call dispatch tag and an associated private identification number.

3. A method of initializing a mobile communication device for making a dispatch call as defined by claim 1, wherein the step of formatting includes formatting the database entry to include a alert call dispatch tag and an associated private identification number.

4. A method of initializing a mobile communication device for making a dispatch call as defined by claim 1, wherein the step of formatting includes formatting the database entry to include a group call dispatch tag and a list of associated group numbers.

5. A method of initializing a mobile communication device for making a dispatch call as defined by claim 1, wherein the step of formatting includes formatting the database entry to include an interconnect call tag.

6. A method of formatting a database entry for use in initializing a mobile communication device for making a dispatch call, comprising the steps of:

receiving, from the communication device at a communication network server over a network including an air network interface, a request for a formatted database entry;

formatting the database entry with a mark up language to provide a browsable database entry having a format and including at least one dispatch tag, the at least one dispatch tag corresponding to a dispatch call type; and transmitting the browsable database entry to the mobile communication device over the network including the air network interface.

7. A method of formatting a database entry as defined by claim 6, wherein the step of formatting includes formatting the database entry to include a private call dispatch tag and an associated private identification number.

8. A method of formatting a database entry as defined by claim 6, wherein the step of formatting includes formatting the database entry to include a alert call dispatch tag and an associated private identification number.

9. A method of formatting a database entry as defined by claim 6, wherein the step of formatting includes formatting the database entry to include a group call dispatch tag and a list of associated group numbers.

10. A method of formatting a database entry as defined by claim 6, wherein the step of formatting includes formatting the database entry to include an interconnect call tag.

* * * * *